(12) United States Patent
Deshpande et al.

(10) Patent No.: US 10,074,066 B2
(45) Date of Patent: Sep. 11, 2018

(54) TWO PHASE PREDICTIVE APPROACH FOR SUPPLY NETWORK OPTIMIZATION

(71) Applicant: International Business Machines Corporation, Armonk, NY (US)

(72) Inventors: Ajay A. Deshpande, White Plains, NY (US); Saurabh Gupta, Irving, TX (US); Arun Hampapur, Norwalk, CT (US); Alan J. King, South Salem, NY (US); Ali Koc, White Plains, NY (US); Pradyumnha G. Kowlani, Foster City, CA (US); Yingjie Li, Yorktown Heights, NY (US); Ding Ding Lin, Beijing (CN); Xuan Liu, Yorktown Heights, NY (US); Christopher Milite, Southbury, CT (US); Brian L. Quanz, Yorktown Heights, NY (US); Chek Keong Tan, Danbury, CT (US); Dahai Xing, White Plains, NY (US); Xiao Bo Zheng, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/017,860

(22) Filed: Feb. 8, 2016

(65) Prior Publication Data
US 2017/0206589 A1    Jul. 20, 2017

Related U.S. Application Data

(60) Provisional application No. 62/279,738, filed on Jan. 16, 2016.

(51) Int. Cl.
*G06Q 30/00* (2012.01)
*G06Q 10/08* (2012.01)
(Continued)

(52) U.S. Cl.
CPC ..... *G06Q 10/08345* (2013.01); *G06F 3/0482* (2013.01); *G06F 3/04847* (2013.01);
(Continued)

(58) Field of Classification Search
CPC .......................................... G06Q 30/06–30/08
(Continued)

(56) References Cited

U.S. PATENT DOCUMENTS 7,848,953 B2  12/2010  Kahlon et al.
7,966,207 B2   6/2011  Altice et al.
(Continued)

OTHER PUBLICATIONS

Jason Andrew Acimovic; "Lowering Outbound Shipping Costs in an Online Retail Environment by Making Better Fulfillment and Replenishment Decisions", MIT PhD thesis, Aug. 2012, pp. 1-198.
(Continued)

*Primary Examiner* — Ethan D Civan
(74) *Attorney, Agent, or Firm* — Cantor Colburn LLP

(57) ABSTRACT

A method, system and computer program product for managing an order in an Omni-channel order fulfillment system is disclosed. A stock-keeping unit (SKU) node level cost is predicted for a plurality of SKUs. The order is received containing one or more SKUs. A candidate list of fulfillment nodes is determined for fulfilling each of the one or more SKUs in the order using the predicted SKU node level cost and a fulfillment node-destination shipping distance. One or more fulfillment nodes are selected from the candidate list, and the order is fulfilled using the selected one or more fulfillment nodes.

15 Claims, 4 Drawing Sheets

(51) Int. Cl.
*G06Q 30/02* (2012.01)
*G06F 3/0482* (2013.01)
*G06F 3/0484* (2013.01)
*G06Q 30/06* (2012.01)
*H04L 12/26* (2006.01)
*G06N 5/04* (2006.01)
*G06Q 10/06* (2012.01)
*G06F 17/30* (2006.01)
*G06N 99/00* (2010.01)

(52) U.S. Cl.
CPC .. *G06F 17/30106* (2013.01); *G06F 17/30144* (2013.01); *G06F 17/30203* (2013.01); *G06F 17/30215* (2013.01); *G06F 17/30371* (2013.01); *G06N 5/04* (2013.01); *G06N 5/045* (2013.01); *G06N 99/005* (2013.01); *G06Q 10/0633* (2013.01); *G06Q 10/06315* (2013.01); *G06Q 10/06375* (2013.01); *G06Q 10/083* (2013.01); *G06Q 10/087* (2013.01); *G06Q 10/0833* (2013.01); *G06Q 10/0838* (2013.01); *G06Q 10/0875* (2013.01); *G06Q 30/0201* (2013.01); *G06Q 30/0206* (2013.01); *G06Q 30/0283* (2013.01); *G06Q 30/0284* (2013.01); *G06Q 30/0635* (2013.01); *H04L 43/0882* (2013.01); *H04L 43/16* (2013.01)

(58) Field of Classification Search
USPC .............................................. 705/26.1–27.2
See application file for complete search history.

(56) References Cited

U.S. PATENT DOCUMENTS

| | | |
|---|---|---|
| 8,015,081 B1 | 9/2011 | Franco |
| 8,352,382 B1* | 1/2013 | Katta ................... G06Q 10/087 |
| | | 705/330 |
| 8,374,922 B1 | 2/2013 | Antony |
| 8,626,333 B2 | 1/2014 | Waddington et al. |
| 8,818,836 B1 | 8/2014 | Braumoeller et al. |
| 2002/0156663 A1 | 10/2002 | Weber et al. |
| 2003/0172007 A1 | 9/2003 | Helmolt et al. |
| 2006/0112049 A1* | 5/2006 | Mehrotra ................ G06F 17/11 |
| | | 706/46 |
| 2012/0150583 A1 | 6/2012 | Dueck et al. |
| 2012/0150692 A1 | 6/2012 | Dueck et al. |
| 2013/0166468 A1 | 6/2013 | Vogelgesang |
| 2014/0143099 A1 | 5/2014 | Wilkins |
| 2014/0279294 A1 | 9/2014 | Field-Darragh et al. |
| 2015/0127438 A1 | 5/2015 | Wedderburn et al. |

OTHER PUBLICATIONS

Kewill Corporation; "Omni-channel Optimization for Retailers: Fulfillment best practice to deliver on customer promises and drive down returns", Jul. 2013, pp. 1-11.

Ping Josephine Xu; "Order Fulfillment in Online Retailing: What Goes Where", MIT thesis, Sep. 2005, pp. 1-146.

* cited by examiner

TWO PHASE PREDICTIVE APPROACH FOR SUPPLY NETWORK OPTIMIZATION

CROSS-REFERENCE TO RELATED APPLICATIONS

The present application claims priority from U.S. Provisional Application Ser. No. 62/279,738, entitled "A SYSTEM AND METHOD TO INCORPORATE NODE FULFILLMENT CAPACITY AND CAPACITY UTILIZATION IN BALANCING FULFILLMENT LOAD ACROSS RETAIL SUPPLY NETWORKS", filed on Jan. 16, 2016, which is incorporated herein by reference in its entirety.

BACKGROUND

The present invention relates generally to supply network optimization and, more specifically, to a two-phase approach to optimize a supply network for fulfilling an order.

Omni-channel retailers employ a number of options or channels to fulfil commerce orders including electronic commerce ("e-commerce") orders. The channels, also referred to as fulfillment nodes, can include stores and e-commerce fulfillment centers, for example. A mixed-integer programming model is often used in order to find optimal solutions for fulfilling orders by using optimization techniques. However, as the retailer grows, the number of fulfillment nodes increases and complexity of an optimization model increases exponentially, requiring increased processing power and lengthening times necessary to determine how to fulfill an order.

SUMMARY

Embodiments include a method, system and computer program product for managing an order in an Omni-channel order fulfillment system. The method includes: predicting a stock-keeping unit (SKU) node level cost for a plurality of SKUs; receiving the order that contains one or more SKUs; determining a candidate list of fulfillment nodes for fulfilling each of the one or more SKUs in the order using the predicted SKU node level cost and a fulfillment node-destination shipping distance; selecting one or more fulfillment nodes from the candidate list; and fulfilling the order using the selected one or more fulfillment nodes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention provide a system, method and computer program product for managing an order in an Omni-channel order fulfillment system. The method includes predicting a stock-keeping unit (SKU) node level cost for each SKU at each fulfillment node, receiving an order that contains different SKUs and determining a candidate list of one or more fulfillment nodes for fulfilling each SKU in the order using the predicted SKU node level cost and a fulfillment node-destination shipping distance for the SKU, which is a shipping distance between the fulfillment node and its final destination, which can be a customer location. One or more fulfillment nodes are selected from the candidate list, and the order is fulfilled using the selected fulfillment nodes.

Figure 1:
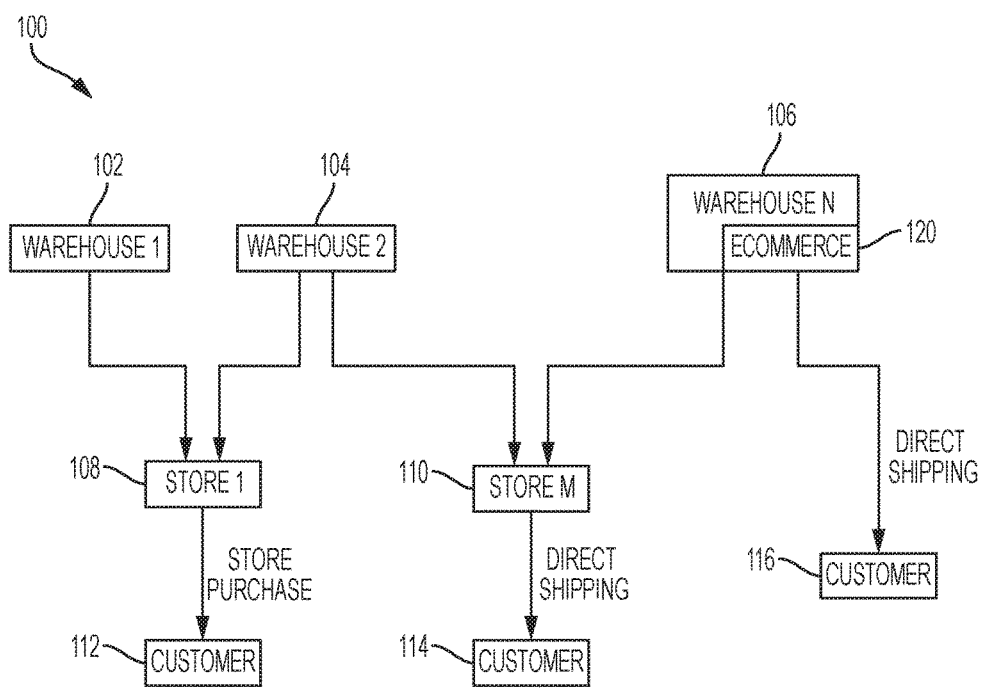
FIG. 1 illustrates a supply network for an Omni-channel retailer in one embodiment of the present invention.

FIG. 1 illustrates a supply network 100 for an Omni-channel retailer in one embodiment of the present invention. An Omni-channel retailer generally has a number of fulfillment nodes or channels by which the retailer can fulfill an order (i.e., a purchase transaction) from a customer. The supply network 100 can include a plurality of warehouses (102, 104, 106) which store various items or stock-keeping units (SKUs) in inventory. A stock keeping unit or SKU is a distinct type of item for sale such as a product or service, and all associated attributes, such as manufacturer, description, material, size, color, packaging, and warranty terms. SKU can also refer to a unique identifier or code that refers to the particular stock keeping unit. The warehouses (102, 104,106) can supply these SKUs to stores (108,110) or other distribution centers upon request by the stores. The illustrative supply network 100 is organized so that Warehouse 1 (102) and Warehouse 2 (104) can supply SKUs to Store 1 (108) and so that Warehouse 2 (104) and Warehouse N (106) can supply SKUs to Store M (110). Warehouse N (106) further includes an e-commerce center 120 for fulfilling orders such as Internet orders, mail-in orders, phone orders, etc.

The illustrative supply network 100 illustrates three channels for supplying an SKU to a customer. In a first method, customer 112 shops at Store 1 (106) and purchases the SKU at Store 1 (106). In another method, customer 114 can order an SKU over an Internet webpage of the retailer, and the retailer can ship the SKU to customer 114 from Store M (110). Alternatively, customer 116 can order the SKU and the retailer can ship the SKU to customer 116 from the e-commerce center 120 of Warehouse N (106). It is understood that other channels for SKU distribution besides what is described with respect to FIG. 1 are available. Each of these distribution channels has a number of costs associated with them. In a large Omni-channel retailer, the number of warehouses, stores and distribution channels can number into the thousands. Therefore, determining a cost-effective method of SKU delivery to the customer includes an optimization method that is a highly computationally-intensive process.

Figure 2:
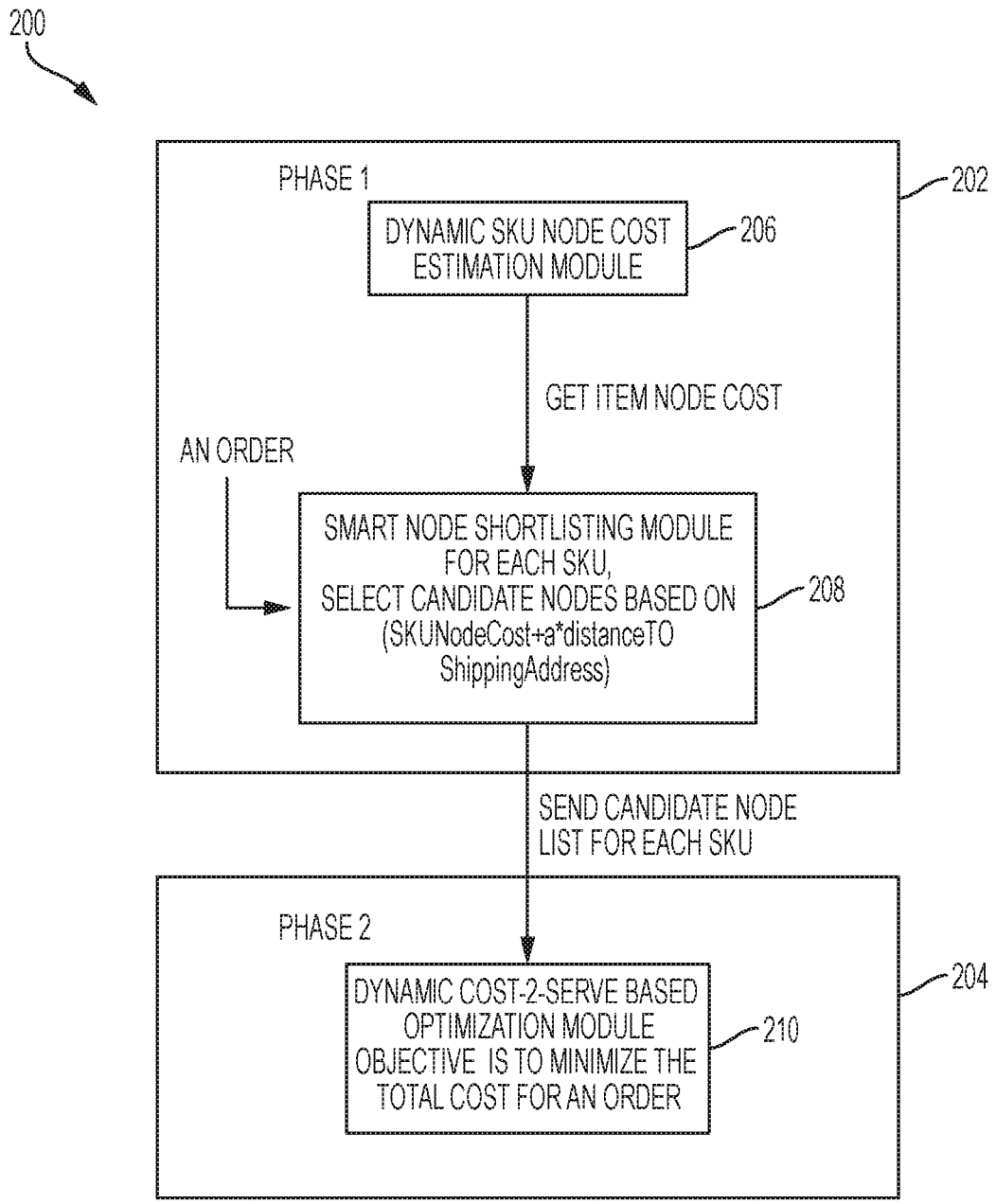
FIG. 2 illustrates a two-step optimization method for reducing costs in a supply network of an Omni-channel retailer in accordance with one embodiment of the present invention.

FIG. 2 illustrates a two-step optimization method 200 for reducing costs in a supply network of an Omni-channel retailer in accordance with one embodiment of the present invention. A first phase 202 of the optimization method generates a short list of fulfillment nodes ("a candidate list")

for an SKU from a large list of fulfillment nodes. The large list of fulfillment nodes can be a list of all fulfillment nodes available to the retailer or some other master list of fulfillment nodes. The candidate list is used in the second phase 204 of the optimization method, which selects a fulfillment node for completing an order from the candidate list using optimization methods.

In the first phase, a Dynamic SKU Node Cost Estimate Module 206 predicts or estimates an SKU node level cost for each of a plurality of SKUs, based on various business costs that are known to the retailer. The SKU node level cost can be estimated for SKU at each fulfillment node. Details for estimating the SKU node level costs are discussed below with respect to FIG. 3. The estimated SKU node level cost is provided from the Dynamic SKU Node Cost Estimate Module 206 to a Smart Node Shortlisting Module 208. The Smart Node Shortlisting Module 208 receives an order that contains one or more SKUs from a customer and determines the candidate list for each SKU from the large list of fulfillment nodes. It is understood that SKU node level costs are known or estimated for each of the one or more SKUs in the order. The candidate list can be determined using a cost equation, such as in Eq. (1) below:

$$fCost = SKUNodeCost + a * distanceToShippingAddress \quad \text{Eq. (1)}$$

wherein fCost is an estimated fulfillment cost for the order via a fulfillment node, the SKUNodeCost (i.e., the SKU node level cost) is the cost determined from the Dynamic SKU Node Cost Estimate Module 206, the distanceToShippingAddress is a distance that can be determined using various geographical databases, shipping databases, etc., and "a" is a weighting parameter that is used to determine a relative importance of SKUNodeCost and distanceToShippingAddress in selecting the candidate list. The candidate list can be selected by determining the fCost for each fulfillment node and selecting fulfillment nodes according to the determined fCost. In one embodiment, the candidate list includes those fulfillment nodes having fCost less than a certain value. In another embodiment, the candidate list includes a selected number of fulfillment nodes. For example, a list of 30 candidates can be selected based on the 30 lowest fCost values determined from Eq. (1).

In the second phase, the candidate list is provided to a Dynamic Cost-to-Serve Based Optimization Module 210. The Dynamic Cost-to-Serve Based Optimization Module 210 runs an optimization program using the candidate list to select one or more fulfillment nodes to fulfill the order. The optimization program can include a mixed integer optimization program. The selected fulfillment node can then be provided to a worker of the Omni-channel retailer, who fulfills the order.

Figure 3:
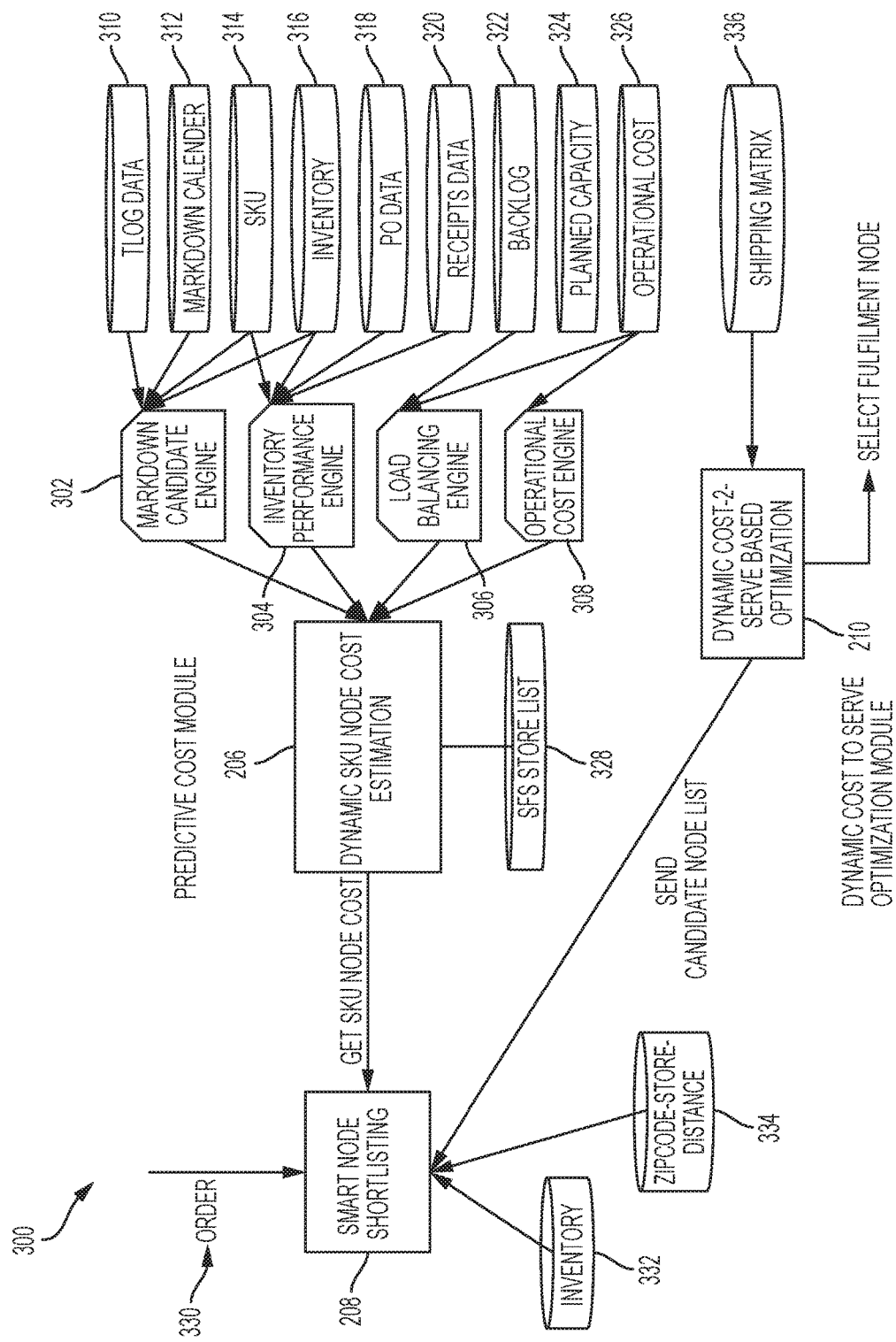
FIG. 3 illustrates a detailed schematic of the optimization process of FIG. 2.

FIG. 3 illustrates a detailed schematic of the optimization process of FIG. 2. The Dynamic SKU Node Cost Estimation Module 206 determines SKUNodeCost using various business operation cost, including, but not limited to, markdown cost 302, inventory performance reward 304, load balancing cost 306 and operational costs 308. The Markdown cost includes costs associated with markdowns based on a retailer's markdown calendar. Markdown cost can be influenced by Tlog data 310, a Markdown calendar 312, SKU markdowns 314 and/or inventory markdown 316. The Inventory performance reward 304 awards a markdown avoidance benefit if an order is directed to stores with below average inventory performance. The inventory performance reward 304 can be based on SKU cost 314, inventory cost 316, purchasing order data 318 and receipts data 320. The load balancing cost 306 assigns a per-SKU cost to over-utilized fulfillment nodes. The load balancing cost 306 can be determined from a backlog database 322 and a planned capacity database 324. The operational cost 308 includes costs to pick and pack an SKU in order to fulfill an order. The operational cost 308 can be determined by an operational cost database 326 which can include, for example, labor costs.

The Dynamic SKU Node Cost Estimation Module 206 can also receive information from a Ship From Store (SFS) list database 328 which includes costs for shipping an SKU from a store.

The Smart Node Shortlisting Module 208 receives the SKUNodeCost from the Dynamic SKU Node Cost Estimation Module 206 and an order 330 from a customer. The Smart Node Shortlisting Module 208 has access to an inventory database 332 that can include a master list of fulfillment nodes. The Smart Node Shortlisting Module 208 also has access to a location of Zip Code database 334 that can be used to determine distances between the customer and fulfillment nodes for determining shipping costs (i.e., distanceToShippingAddress). As discussed with respect to FIG. 2 the SmartNode Shortlisting Module 208 provides a candidate list of fulfillment nodes.

The Dynamic Cost-to-Serve Based Optimization Module 210 receives the candidate list and selects one or more fulfillment nodes for fulfilling the order using the candidate list and a Shipping Matrix database 336.

Figure 4:
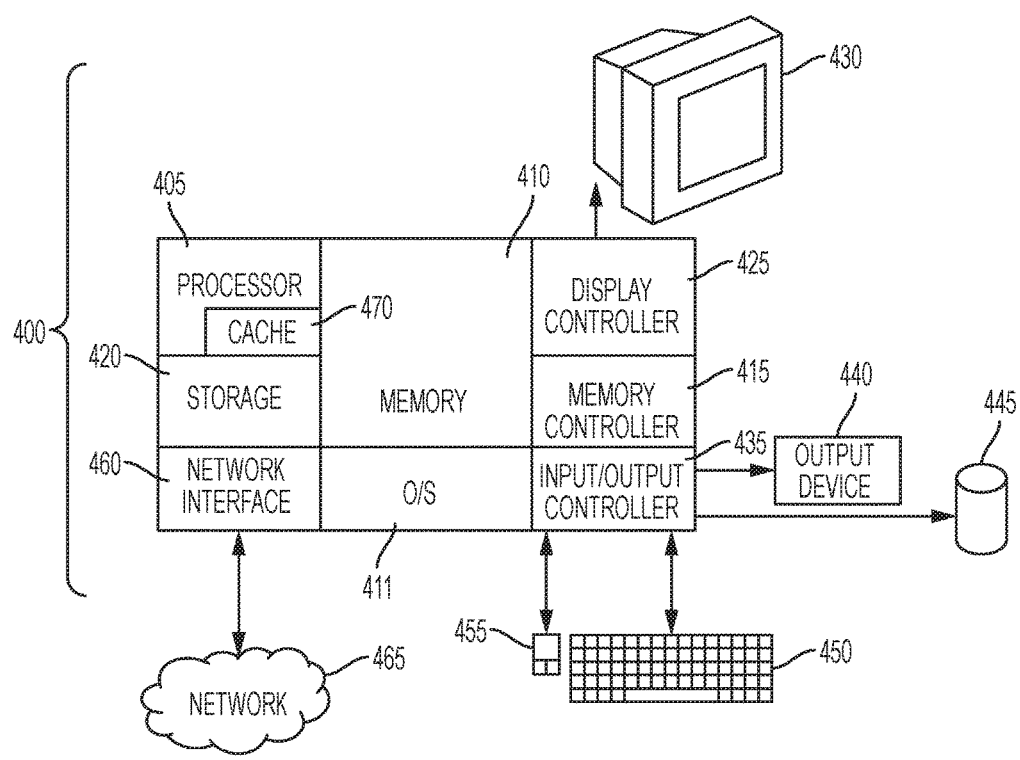
FIG. 4 illustrates a block diagram of a computer system for use in implementing a system or method according to some embodiments.

FIG. 4 illustrates a block diagram of a computer system 400 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the systems and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 400, such as that illustrated in FIG. 4.

Technical effects and benefits of some embodiments include reducing a size of an optimization problem associated with selecting a fulfillment channel, thereby reducing computation time and reducing the use of computer resources. The invention allows retailers to consider multiple business objectives and to customize business goals according to business needs.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reducing a cost of fulfilling an order in an Omni-channel order fulfillment system, the method comprising:

predicting, by a processor, a stock-keeping unit (SKU) node level cost for a plurality of SKUs, wherein the SKU node level cost includes a markdown cost for the SKU;

receiving the order that contains one or more SKUs;

determining a master list of fulfillment nodes available for providing the one or more SKUs to fulfill the order;

determining a fulfillment cost for each of the fulfillment nodes in the master list for each of the one or more SKUs, wherein the fulfillment cost for a selected node is a summation of the predicted SKU node level cost and a weighted fulfillment node-destination shipping distance cost;

selecting, from the master list of fulfillment nodes, a candidate list of fulfillment nodes for fulfilling each of the one or more SKUs in the order, the candidate list including a selected number of fulfillment nodes having a lowest fulfillment cost, wherein the candidate list is shorter than the master list;

providing the candidate list and a shipping database to an optimization program to select one or more fulfillment nodes from the candidate list;

causing, by the processor, the one or more SKUs of the order to ship from the selected one or more fulfillment nodes to fulfill the order; and selecting the one or more fulfillment nodes from the candidate list using a mixed integer optimization program, where using the candidate list in the mixed integer optimization program reduces a processing time for fulfilling the order.

2. The method of claim 1, wherein predicting the SKU node level cost further comprises estimating business operational costs for the SKU at each fulfillment node.

3. The method of claim 2, wherein the business operational costs further comprise at least one of: inventory performance costs, load balancing costs, daily operating costs, and costs for shipping from fulfillment node to customer.

4. The method of claim 1, further comprising determining the candidate list based on a cost computed based on the predicted SKU node level cost and the fulfillment node-destination shipping distance.

5. The method of claim 4, further comprising selected a relative weight of the predicted SKU node level cost and the fulfillment node-destination shipping distance in determining the candidate list.

6. A system for reducing a cost of fulfilling an order for an Omni-channel retailer, the system comprising:
a memory having computer readable instructions; and
one or more processors for executing the computer readable instructions, the computer readable instructions comprising:
predicting a stock-keeping unit (SKU) node level cost for a plurality of SKUs, wherein the SKU node level cost includes a markdown cost for the SKU;
receiving the order that contains one or more SKUs;
determining a master list of fulfillment nodes available for providing the one or more SKUs to fulfill the order;
determining a fulfillment cost for each of the fulfillment nodes in the master list for each of the one or more SKUs, wherein the fulfillment cost for a selected node is a summation of the predicted SKU level cost and a weighted fulfillment node-destination shipping distance cost;
selecting, from the master list of fulfillment nodes, a candidate list of fulfillment nodes for fulfilling each of the one or more SKUs in the order, the candidate list including a selected number of fulfillment nodes having a lowest fulfillment cost, wherein the candidate list is shorter than the master list;
providing the candidate list and a shipping database to an optimization program to select one or more fulfillment nodes from the candidate list;
causing the one or more SKUs of the order to ship from the selected one or more fulfillment nodes to fulfill the order; and
selecting the one or more fulfillment nodes from the candidate list using a mixed integer optimization program, where using the candidate list in the mixed integer optimization program reduces a processing time for fulfilling the order.

7. The system of claim 6, wherein predicting the SKU node level cost further comprises estimating business operational costs for the SKU at each fulfillment node.

8. The system of claim 7, wherein the business operational costs further comprise at least one of: inventory performance costs, load balancing costs, daily operating costs, and costs for shipping from fulfillment node to customer.

9. The system of claim 6, further comprising determining the candidate list based on a cost computed based on the predicted SKU node level costs and the fulfillment node-destination shipping distances.

10. The system of claim 9, further comprising selected a relative weight of the predicate SKU node level costs and the fulfillment node-destination shipping distances in determining the candidate list.

11. A computer program product for reducing a cost of fulfilling an order in an Omni-channel order fulfillment system, the computer program product comprising a computer readable storage medium having program instructions embodied therewith, the program instructions executable by a processor to cause the processor to perform:
predicting a stock-keeping unit (SKU) node level cost for a plurality of SKUs, wherein the SKU node level cost includes a markdown cost for the SKU;
receiving the order that contains one or more SKUs;
determining a master list of fulfillment nodes available for providing the one or more SKUs to fulfill the order;
determining a fulfillment cost for each of the fulfillment nodes in the master list for each of the one or more SKUs, wherein the fulfillment cost for a selected node is a summation of the predicted SKU node level cost and a weighted fulfillment node-destination shipping distance cost;
selecting, from the master list of fulfillment nodes, a candidate list of fulfillment nodes for fulfilling each of the one or more SKUs in the order, the candidate list including a selected number of fulfillment nodes having a lowest fulfillment cost, wherein the candidate list is shorter than the master list;
providing the candidate list and a shipping database to an optimization program to select one or more fulfillment nodes from the candidate list; and
causing the one or more SKUs of the order to ship from to the selected fulfillment nodes to fulfill the order; and
selecting the one or more fulfillment nodes from the candidate list using a mixed integer optimization program, where using the candidate list in the mixed integer optimization program reduces a processing time for fulfilling the order.

12. The computer program product of claim 11, wherein predicting the SKU node level cost further comprises estimating business operational costs for the SKU at each fulfillment node.

13. The computer program product of claim 12, wherein the business operational costs further comprise at least one of: inventory performance costs, load balancing costs, daily operating costs, and costs for shipping from fulfillment node to customer.

14. The computer program product of claim 11, further comprising determining the candidate list based on a cost computed based on the predicted SKU node level cost and the fulfillment node-destination shipping distance.

15. The computer program product of claim 14, further comprising selected a relative weight of the predicate SKU node level cost and the fulfillment node-destination shipping distance in determining the candidate list.

* * * * *